United States Patent [19]

Melman

[11] Patent Number: 5,124,547
[45] Date of Patent: Jun. 23, 1992

[54] COLOR SEPARATION APPARATUS FOR REDUCING LAG IN PHOTOSENSORS USING COLOR AUXILIARY LIGHT BIASING

[75] Inventor: Haim Z. Melman, Kfar Sava, Israel
[73] Assignee: Scitex Corporation Ltd., Herzliya, Israel
[21] Appl. No.: 566,271
[22] Filed: Aug. 10, 1990

[30] Foreign Application Priority Data

Aug. 20, 1989 [IL] Israel ................................. 91366

[51] Int. Cl.$^5$ ................................................. H01J 5/16
[52] U.S. Cl. ....................................... 250/226; 358/55
[58] Field of Search .............................. 250/226, 211 J; 358/223, 225, 55, 217; 315/387; 356/438

[56] References Cited

U.S. PATENT DOCUMENTS

| | | | |
|---|---|---|---|
| 3,711,210 | 1/1973 | Krukowski | 356/438 |
| 3,925,657 | 12/1975 | Levine | 250/211 J |
| 3,956,584 | 5/1976 | Tanaka et al. | 358/225 |
| 4,068,261 | 1/1978 | Yoshizaki | 358/217 |
| 4,216,494 | 8/1980 | Oshima et al. | 358/223 |
| 4,237,475 | 12/1980 | Sekiguchi | 358/55 |
| 4,598,235 | 7/1986 | Ryan | 315/387 |
| 4,992,704 | 2/1991 | Stinson | 315/312 |

FOREIGN PATENT DOCUMENTS 1240468  8/1967  United Kingdom .

OTHER PUBLICATIONS

D. G. Perkins, "Features of a New Three Tube Colour Television Camera", Journal of the SMPTE, vol. 81 Jan. 1972 pp. 13–20.

S. B. Mende, "A Low Light Level SlowScan TV Camera for Satellite Application", Proceedings of the IEEE, vol. 57, No. 3, Mar. 1969.

J. Dolledamp, "One-inch Diameter Plumbicon camera tube type 19XQ", Mulliard Technical Communications, No. 109, Jan. 1971.

D. F. Barbe, "Imaging Devices Using the Charged Coupled Concept", Proceedings of the IEEE, vol. 63, Jan. 1975.

Fairchild Weston Systems, CCD Imaging Division, "An Application Note: Photosite Transfer Loss (PSTL)", 1989 Fairchild Weston CCD Imaging Databook 1989 pp. 271–273.

H. H. Hines et al., "Video Requirements for Digital Subtraction Angiography" Medical Imaging and Instrumentation 1984, SPIE vol. 486, Apr. 1984.

Primary Examiner—David C. Nelms
Assistant Examiner—Que T. Le
Attorney, Agent, or Firm—Darby & Darby

[57] ABSTRACT

Apparatus is disclosed for reducing lag in photosensors in a color separation assembly having an optical imaging path. The apparatus comprises a plurality of colored LEDs located outside of said optical path and arranged for illumination of the photosensors. The color and location of the colored LEDs are preferably selected to match the transmission and reflection characteristics of the color separation assembly.

8 Claims, 8 Drawing Sheets

COLOR SEPARATION APPARATUS FOR REDUCING LAG IN PHOTOSENSORS USING COLOR AUXILIARY LIGHT BIASING

FIELD OF THE INVENTION

The present invention relates to semi-conductor light sensors generally and to semi-conductor light sensors with lag.

BACKGROUND OF THE INVENTION

It is well known in the prior art that semi-conductor light sensors cannot respond instantaneously to abrupt changes in light intensity. This effect includes both buildup and decay lags, where buildup lag is caused by the inability of the photosensor to fully respond to light at the very instant that the light is first applied and decay lag is caused by the inability of the photosensor to fully decrease the output signal level to its dark value at the instant that the light is removed. An article, "Imaging Devices Using the Charge-Coupled Concept," by David F. Barbe, published in the *Proceedings of the IEEE*, vol. 63, Jan. 1975, details the causes of the lag effect.

A well-known solution to the problem of lag is to provide the semi-conductor light sensor with a bias light or "fat zero" in addition to the incident illumination. The use of a bias light and its effects on the operation of the light sensors is discussed in a number of articles, among them, "An Application Note: Photosite Transfer Loss (PSTL)," published in the 1989 *Fairchild Weston CCD Imaging Databook*, by the Fairchild Weston Systems, CCD Imaging Division, and "Video requirements for digial subraction angiography," by Horace H. Hines, et al, published in *Medical Imaging and Instrumentation '84*, SPIE vol 486, April 1984.

Apparatus for reducing lag utilizing a white light lamp is disclosed in the article, "Features of a New Three-Tube Color Television Camera," by D. G. Perkins and published by the *Journal of the SMPTE*, vol. 81, Jan. 1972. The apparatus comprises a "diascope" placed between the camera lens and the RGB color component pickup tubes. The diascope is built of prisms which project the bias white light from its source to each of the pickup tubes.

S. B. Mende, in an article, "A Low Light Level Slow Scan TV Camera for Satellite Application," discloses a method for bias illumination consisting of mounting light sources on the camera tube to relatively uniformly illuminate the photocathode surface.

G.B. Patent 1,240,468 discloses a bias illumination apparatus comprising a camera lens, a beam splitting system to split the incoming white light into its component RGB colors, and a fiber optic cable which transmits white light from a source to a location between the camera lens and the beam splitting system for the purpose of bias illumination.

In an article "One-inch diameter Plumbicon TM camera tube type 19XQ," by J. Dolledamp, *Mulliard Technical Communications*, No. 109, Jan. 1971, two methods are disclosed for reducing the lag. One is the incorporation of an electron gun with a high speed readout gun and the second is the incorporation of bias illumination via a lightpipe.

The abovementioned articles and patents have illustrated front illumination (i.e. including the bias illumination with the incoming light signal). It is also known to back illuminate, or to illuminate the sensor from a direction which is not part of the optical imaging path. For cathode-ray tubes, the back illumination is achieved by illuminating the internal side of the tube face. CCD sensors have no optical access to the back of the sensitive layer and thus, back illumination is not utilized with them.

Additionally, the abovementioned articles and patents have utilized white light sources which are typically incandescent sources. Incandescent sources have the disadvantage that the color balance achieved changes with changing intensity. Other light sources, such as xenon lamps, are complicated to operate, are relatively unstable, have a short life and are expensive to buy. Flourescent lamps, yet another choice for a white light source, are large, a ballast is required and the control of the intensity is problematic.

SUMMARY OF THE INVENTION

It is an object of the present invention to produce bias illumination with light emitting diode (LED) light sources and without mechanically interfering with the optical imaging path, together with a color separation assembly.

There is thus provided in accordance with the present invention, an apparatus for reducing lag in photosensors of a color separation assembly having an optical imaging path which comprises a plurality of colored LEDs located outside of the optical path which are arranged to illuminate the photosensors.

Additionally, in accordance with a preferred embodiment of the present invention, the color and location of the colored LEDs are selected to match the transmission and reflection characteristics of the color separation assembly. The LEDs are chosen from any possible collection of some or all of green, red and blue LEDs.

Further, in accordance with a preferred embodiment of the present invention, the color separation assembly comprises optical filter apparatus for separating incident white light into component colors and for directing the light of the LEDs onto the photosensors. The optical filter means comprises dichroic filters or, alternatively, prisms with dichroic layers.

It should be noted that LED light sources have been chosen since they are inexpensive, easy to operate, small, and have a long life and a high degree of intesity control, either by current or by duty cycle.

BRIEF DESCRIPTION OF THE DRAWINGS

The present invention will be understood and appreciated more fully from the following detailed description taken in conjunction with the drawings in which.

DETAILED DESCRIPTION OF THE PRESENT INVENTION

Figure 1:
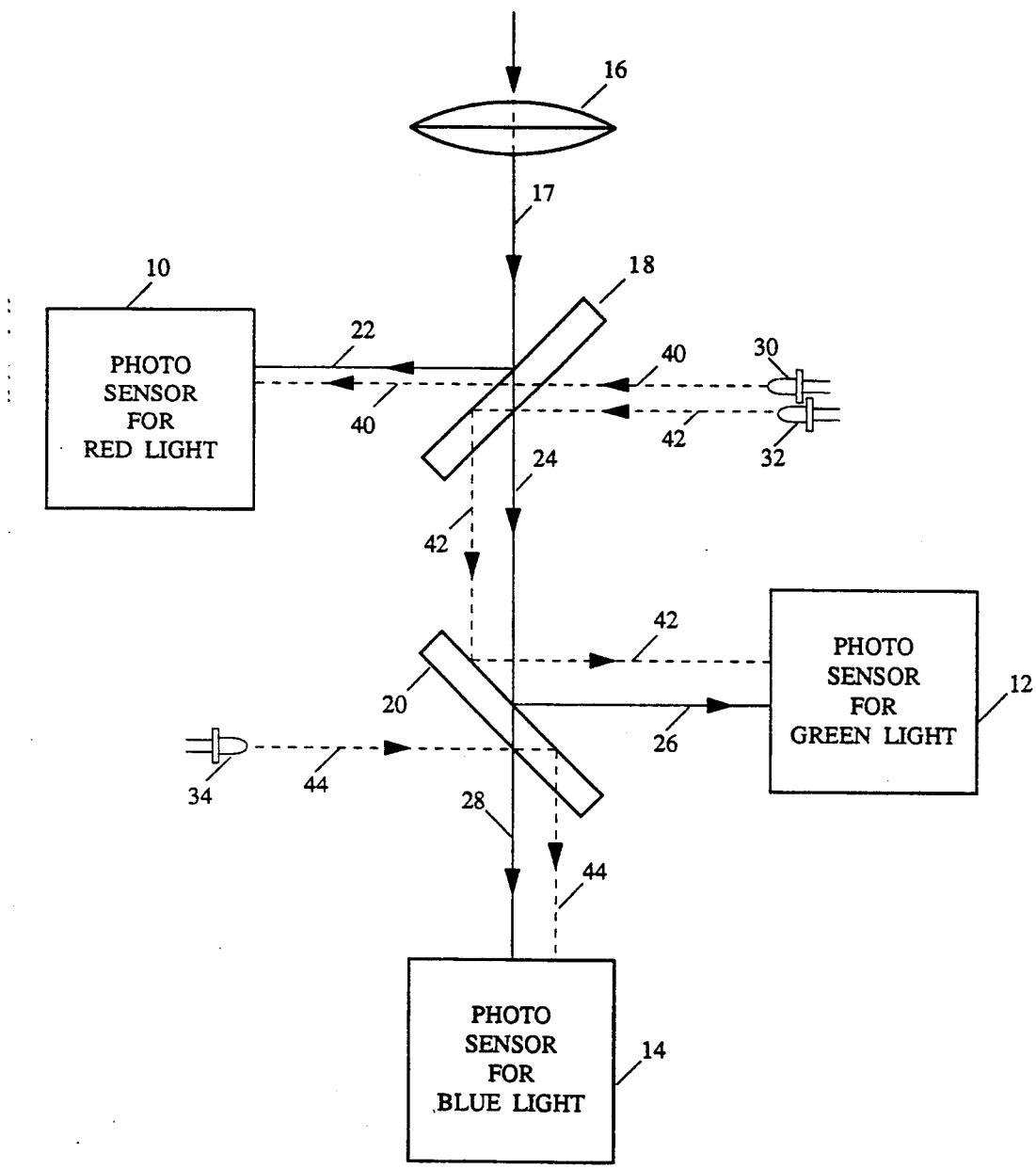
FIG. 1 is a schematic illustration of a lag reducing apparatus operative and constructed in accordance with the present invention.

Reference is now made to FIG. 1 which illustrates a lag reducing apparatus operative and constructed in accordance with the present invention. The apparatus comprises three photosensors 10, 12 and 14, such as CCD photosensors, for receiving color in the red, green and blue ranges of the color spectrum, respectively, a lens 16 for imaging the object on the photosensors 10, 12 and 14 and two dichroic filters 18 and 20, such as those manufactured by OCLI of Santa Rosa, California of the USA, for separating an incoming white light beam 17 that is coincident with the optical axis into beams 22, 24, 26 and 28. Filter 18 separates beam 17 into beams 22 and 24 where beam 22 comprises light in the red range of the visible spectrum and beam 24 comprises light in the green and blue ranges of the visible spectrum. Filter 20 separates beam 24 into beams 26 and 28 where beam 26 comprises light in the green range and beam 28 comprises light in the blue range.

Figure 2A:
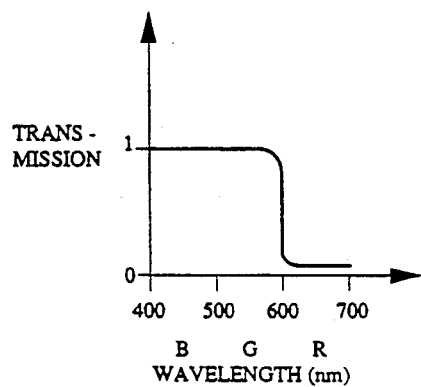
FIGS. 2A-2D are graphic illustrations of characteristics of filters used in the apparatus of FIG. 1.
Figure 2B:
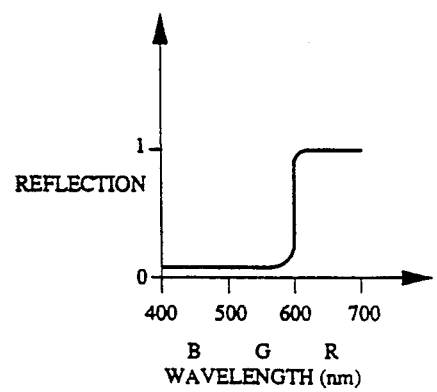
Figure 2C:
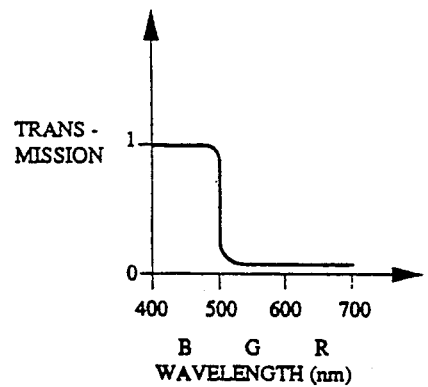
Figure 2D:
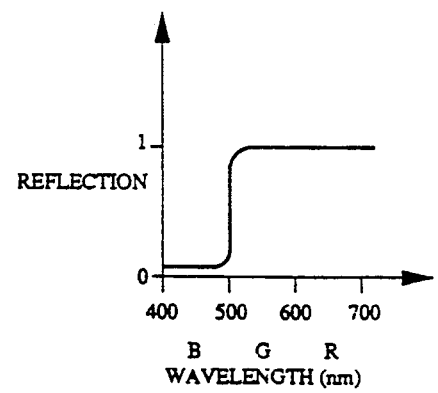

The filter characteristics of filters 18 and 20 are shown in FIGS. 2A–2D, where FIGS. 2A and 2C illustrate the transmission characteristics of filters 18 and 20, respectively, and FIGS. 2B and 2D illustrate the reflection characteristics of the respective filters. It will be appreciated that filter 18 transmits light with wavelengths between 400 and 600 nm (i.e. in the blue and green ranges of the light spectrum) and reflects light with wavelengths greater than 600 nm (i.e. in the red range). Filter 20, on the other hand, transmits light in the blue range and reflects light in the green and red ranges.

Reference is now made back to FIG. 1. In accordance with an embodiment of the present invention, a typically green LED 30 is placed behind filter 18 such that its light beam is transmitted through filter 18 to photosensor 10, as indicated by beam 40. It will be appreciated that green LED 30 is utilized for bias illumination of photosensor 10 in order to reduce lag.

In accordance with an embodiment of the present invention, a second LED 32, typically of red color, is placed behind filter 18. Its light beam, denoted 42 in FIG. 1, is twice reflected, once by filter 18 towards filter 20 and once by filter 20 towards photosensor 12. A third LED 34, typically of either red or green color, is located behind filter 20 and its beam, denoted 44, is reflected to photosensor 14.

It is a feature of the present invention that LEDs are used for bias illumination. LEDs are advantageous for bias illumination because of the well known ability to control their intensity by changing current and/or duty cycle without affecting their color, as occurs with incandescent light sources.

It is an additional feature of the present invention that the LEDs 30, 32 and 34 are located outside of the optical imaging path marked by beams 17, 22, 24, 26 and 28. This feature ensures that the bias illumination does not mechanically interfere with the optical imaging onto the photosensors 10, 12 and 14.

Figure 3:
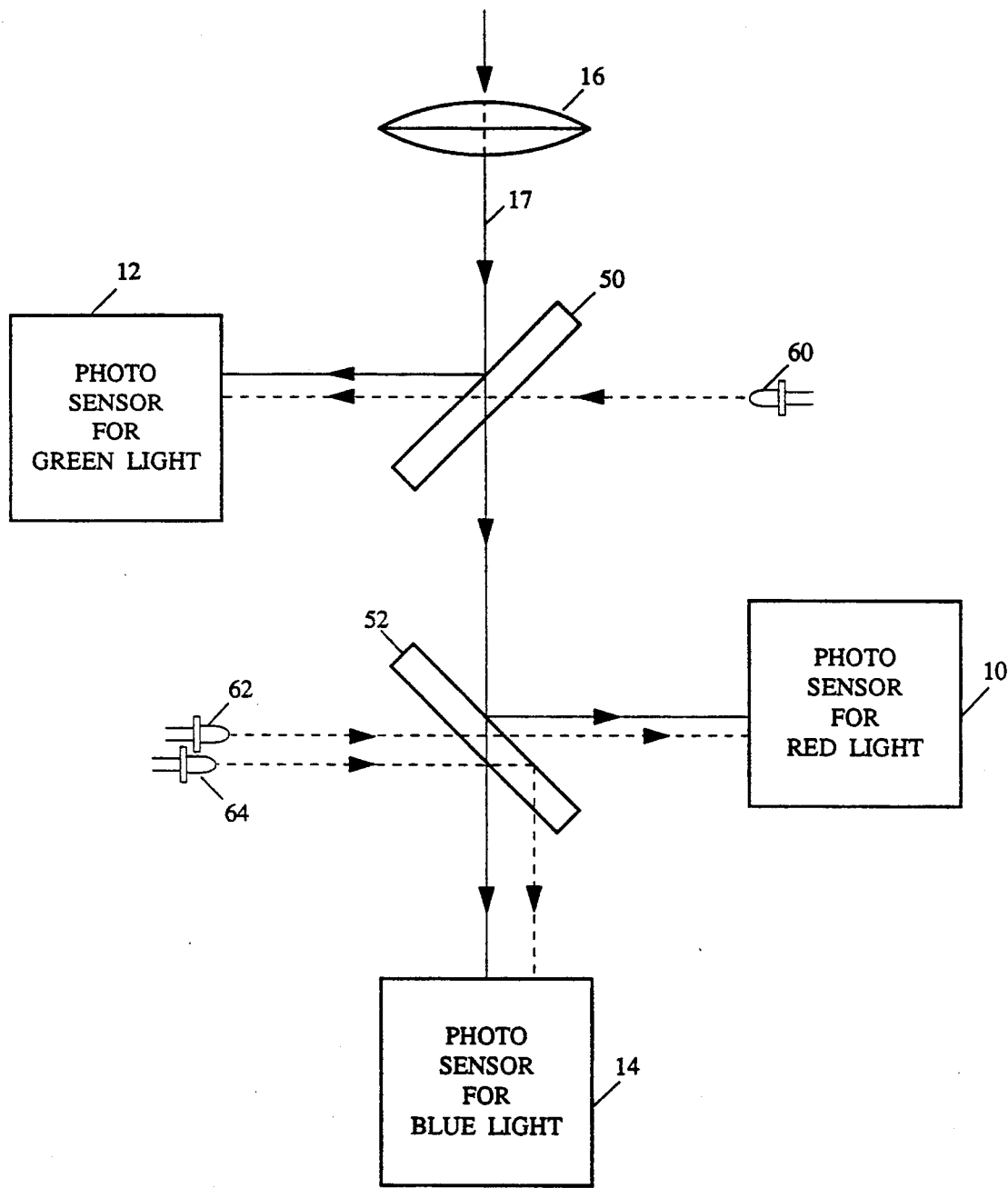
FIG. 3 is a schematic illustration of a second embodiment of the present invention.
Figure 4A:
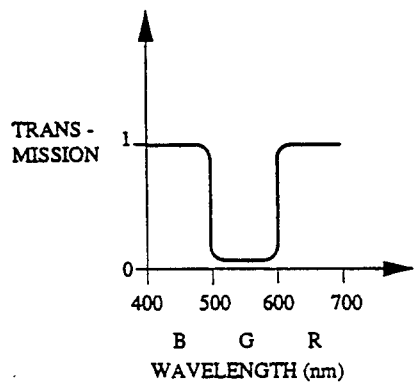
FIGS. 4A-4D are graphic illustrations of characteristics of filters used in the apparatus of FIG. 3.
Figure 4B:
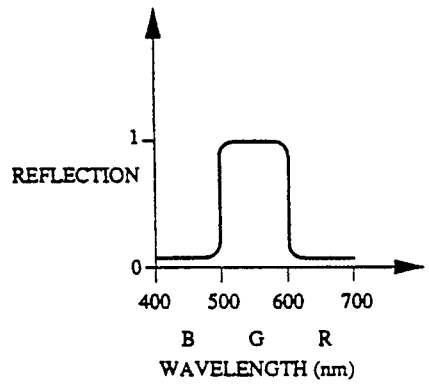
Figure 4C:
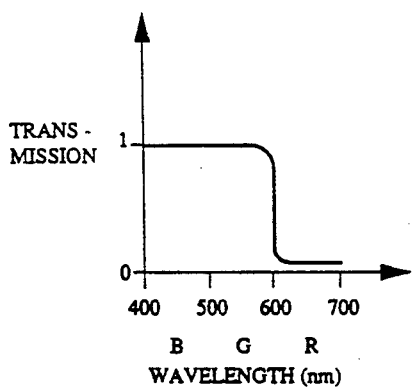
Figure 4D:
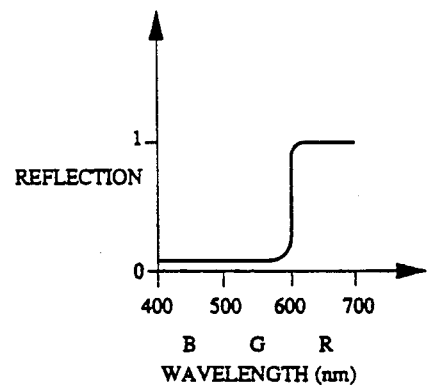

Reference is now made to FIG. 3 which illustrates a second embodiment of the present invention which utilizes dichroic filters 50 and 52 rather than dichroic filters 18 and 20. FIGS. 4A–4D illustrate the characteristics of filters 50 and 52. Thus, filter 50, as shown in FIGS. 4A and 4B reflects light in the green range of the spectrum and transmits light in the blue and red ranges and filter 52, as shown in FIGS. 4C and 4D, reflects red light and transmits light in the blue and green ranges.

Reference is now made back to FIG. 3. LEDs 60, 62 and 64 are selected to match the characteristics of filters 50 and 52 as follows. LEDs 60 and 62 are typically red and green LEDs, respectively, whose light beam will be transmitted by filters 50 and 52 to photosensors 12 and 10 respectively. LED 64 is a typically red LED whose light beam will be reflected by filter 52 and will impinge upon photosensor 14.

It will be appreciated by those skilled in the art that any dichroic filters can be used in the present invention, for example, filters 18 and 20 can be replaced by prisms coated with a dichroic layer.

Additionally, it will be appreciated that the type and the location of the LEDs are selected empirically and depend on the particular transmission and reflection characteristics of the filters selected as well as upon the orientation of the filters.

A designer of a lag-reducing apparatus first selects a set of two filters and their orientations. The locations of the three photosensors, and the color range they receive, are defined from the filter types and orientations. The designer then selects a first LED to be placed behind a first filter whose color is such that its light is transmitted by the first filter onto a first photosensor. A second LED is placed behind a second filter. Its color is preferably chosen such that its light is transmitted by the second filter onto a second photosensor. If this is not possible, due to the available color choices of LEDs or due to the selected filter types, the color is chosen such that it is reflected by the second filter onto a third photosensor. A third LED is placed behind either the first or the second filter in a location such that its light will be reflected by at least one of the filters in such a way as to be incident upon the remaining photosensor.

Figure 7:
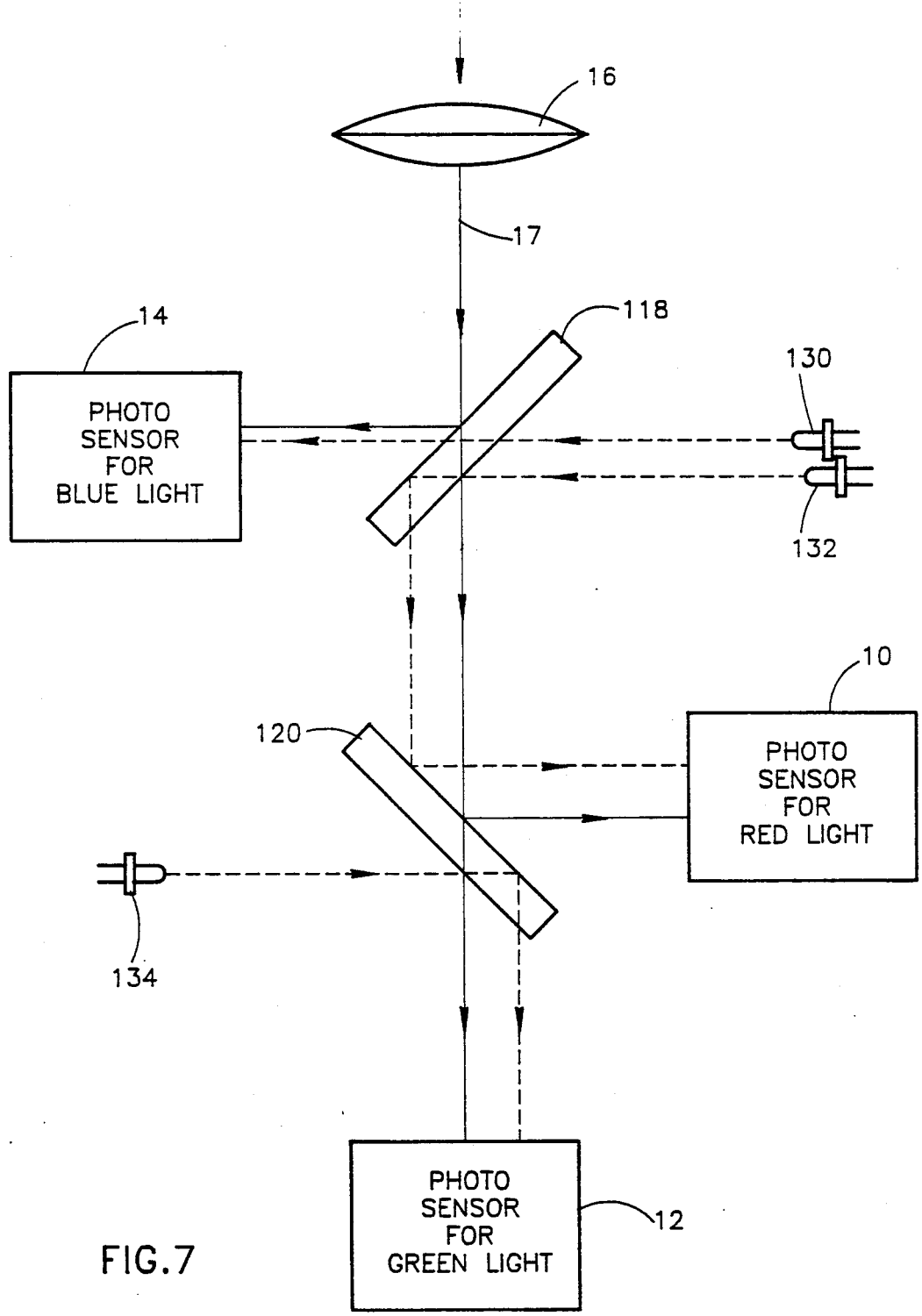
FIG. 7 is a schematic illustration of an embodiment of the present invention utilizing blue LEDs.

It should be noted that blue LEDs have not been selected because LEDs in the blue range of the visible light spectrum are typically very expensive. However, as shown with reference to FIG. 7, blue LEDs can be utilized. Yellow LEDs have not been selected because their color range is located close to the cutoff point of filters 18, 50 and 52.

Figure 5:
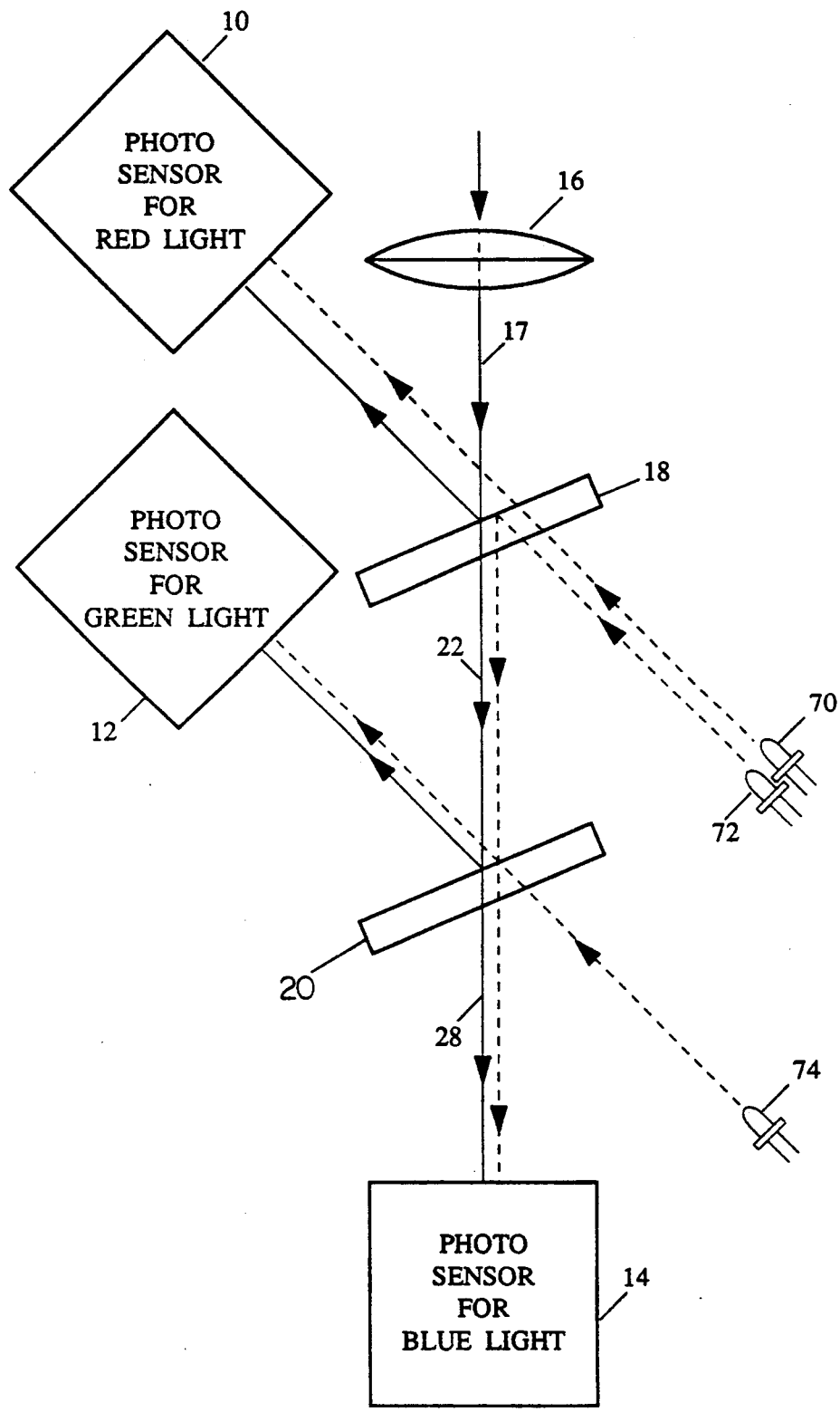
FIG. 5 is a schematic illustration of a third embodiment of the present invention.

FIG. 5 is an illustration of a third embodiment of the present invention illustrating a third possible geometry for the filters. This embodiment utilizes filters 18 and 20 (FIG. 1) placed in a second geometry. The orientation of filter 18 has slightly changed from that of FIG. 1; however, filter 20 has a totally new orientation. LEDs 70 and 72, are placed behind filter 18 and are of the colors green and red, respectively. A red LED 74 is placed behind filter 20. LED 74 can alternatively be a green LED. It will be noted that LEDs 70, 72 and 74 are of equivalent colors as LEDs 30, 32 and 34 of FIG. 1. However, in this third embodiment, the LEDs 70, 72 and 74 are located at an angle, which is generally not 90°, to the optical axis marked by 17, 22 and 28.

Figure 6:
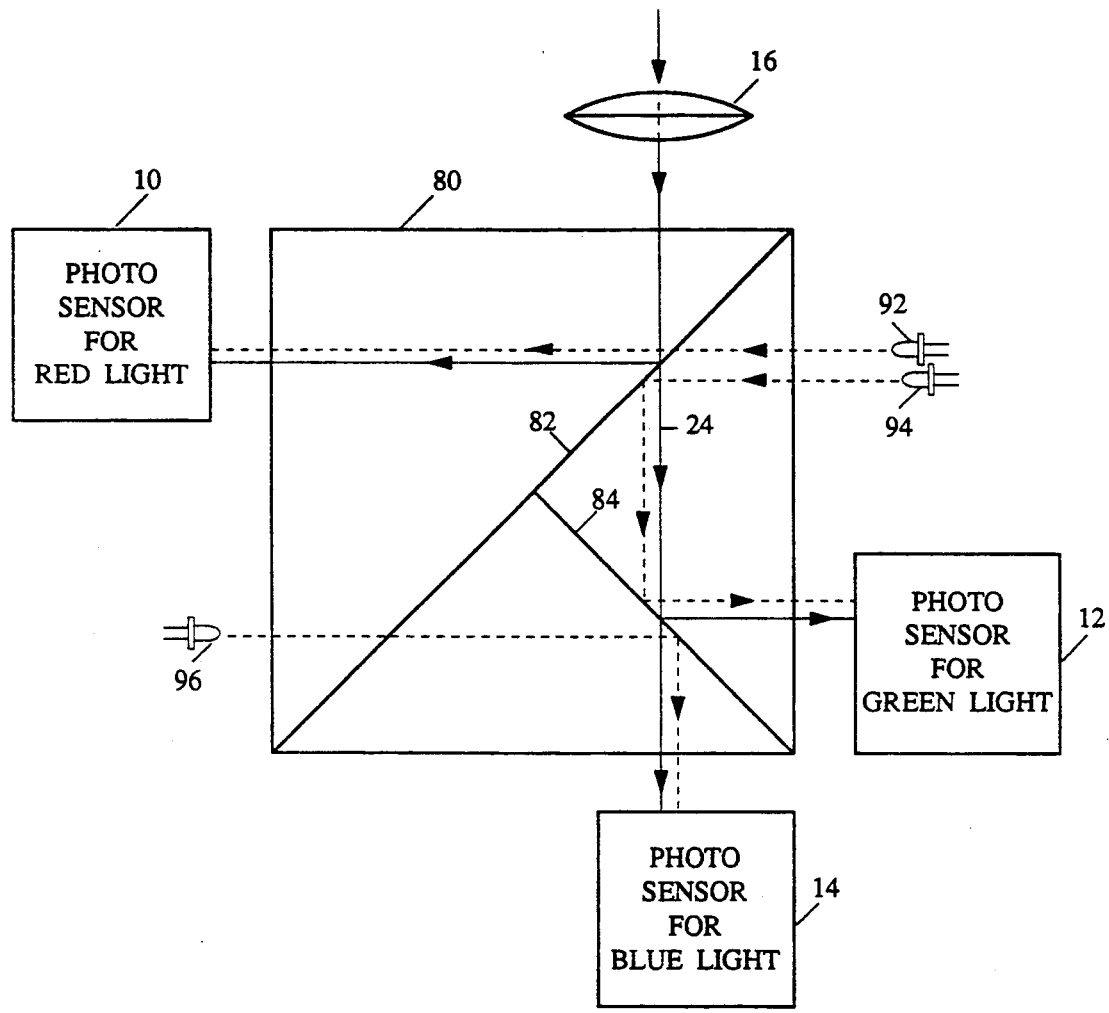
FIG. 6 is a schematic illustration of an embodiment of the present invention utilizing a prism coated with a dichroic layer.

Reference is now made to FIG. 6 which illustrates an embodiment of the present invention utilizing a prism 80 coated with dichroic layers on the two surfaces 82 and 84 whose filtering characteristics are similar to filters 18 and 20 of FIG. 1. Photosensors 10, 12 and 14 are placed in locations similar to those of FIG. 1 and LEDs 92, 94 and 96 are of similar colors and are positioned similar to LEDs 30, 32 and 34 of FIG. 1.

Figure 8A:
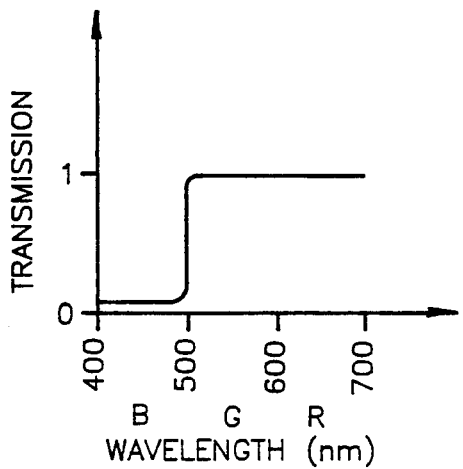
FIGS. 8A–8D are graphic illustrations of characteristics of filters used in the apparatus of FIG. 7.
Figure 8B:
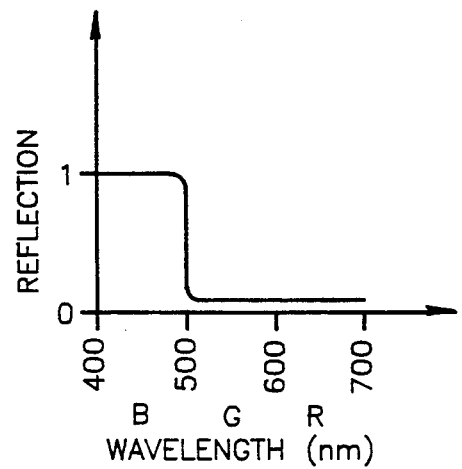
Figure 8C:
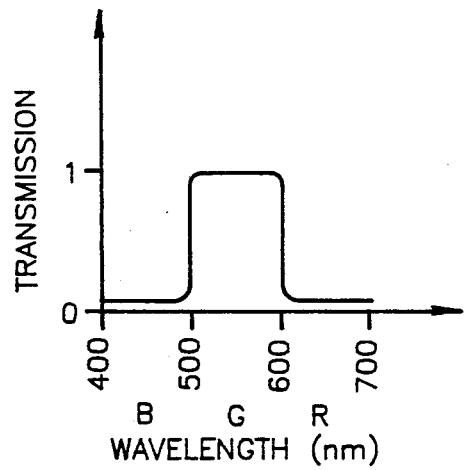
Figure 8D:
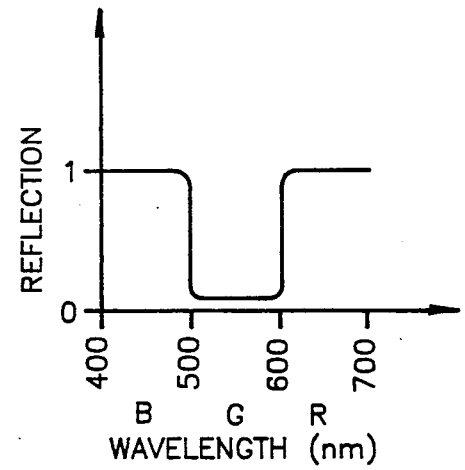

Reference is now made to FIGS. 7 and 8A–8D which illustrate a further alternative embodiment of the present invention utilizing blue LEDs. In this embodiment, similar to that shown in FIG. 1, photosensor 14 receives reflected light from a filter 118, photosensor 10 receives reflected light from a filter 120 and photosensor 12 receives the remaining light. The transmission and reflection characteristics of filter 118, shown in FIGS. 8A and 8B, are such that green and red light are transmitted and blue light is reflected. Therefore, a LED 130, can be either green or red and a LED 132 is blue. As before, LEDs 130 and 132 are placed behind filter 118. The transmission and reflection characteristics of filter 120, shown in FIGS. 8C and 8D are such that green light is transmitted and red and blue light is reflected. Thus, a LED 134, placed behind filter 120, can be either blue or red.

It will be appreciated by persons skilled in the art that the present invention is not limited by what has been particularly shown and described hereinabove. The scope of the present invention is defined only by the claims which follow:

I claim:

1. Color separation apparatus comprising:
   a plurality of photosensors;
   lens means for imaging an object onto said plurality of photosensors along an optical imaging path;
   optical filter means disposed along said optical imaging path for causing light of different spectral ranges to impinge on different ones of said plurality of photosensors; and
   means for reducing lag in said plurality of photosensors and comprising:
   a plurality of colored LEDs located outside of said optical imaging path, each of said plurality of colored LEDs being arranged for illumination of a corresponding one of said plurality of photosensors.

2. Apparatus according to claim 1 and wherein the color of each of said plurality of colored LEDs is selected to match the spectral range of light received by the corresponding one of said plurality of photosensors.

3. Apparatus according to claim 1 and wherein said plurality of color LEDs comprises LEDs of at least one of the following colors: green, red and blue.

4. Apparatus according to claim 2 and wherein said plurality of color LEDs comprises LEDs of at least one of the following colors: green, red and blue.

5. Apparatus in accordance with claim 1 and wherein said optical filter means comprises dichroic filters.

6. Apparatus in accordance with claim 1 and wherein said optical filter means comprises prisms with dichroic layers.

7. Apparatus according to claim 1 and wherein said plurality of photosensors includes three photosensors each detecting a different color and said plurality of colored LEDs includes LEDs of only two different colors.

8. Apparatus according to claim 2 and wherein said plurality of photosensors includes three photosensors each detecting a different color and said plurality of colored LEDs includes LEDs of only two different colors.

* * * * *